United States Patent Office 3,268,267
Patented August 23, 1966

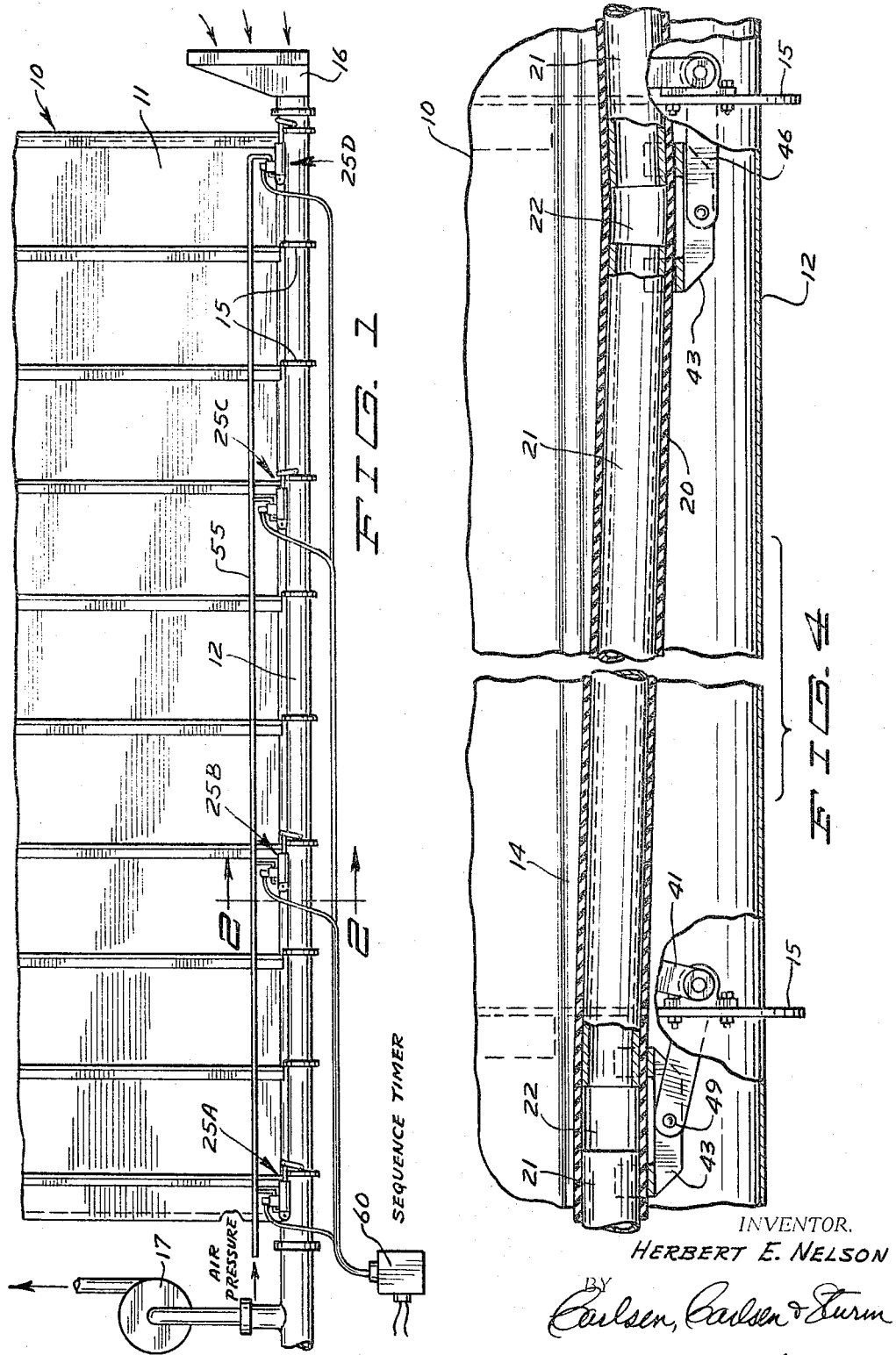

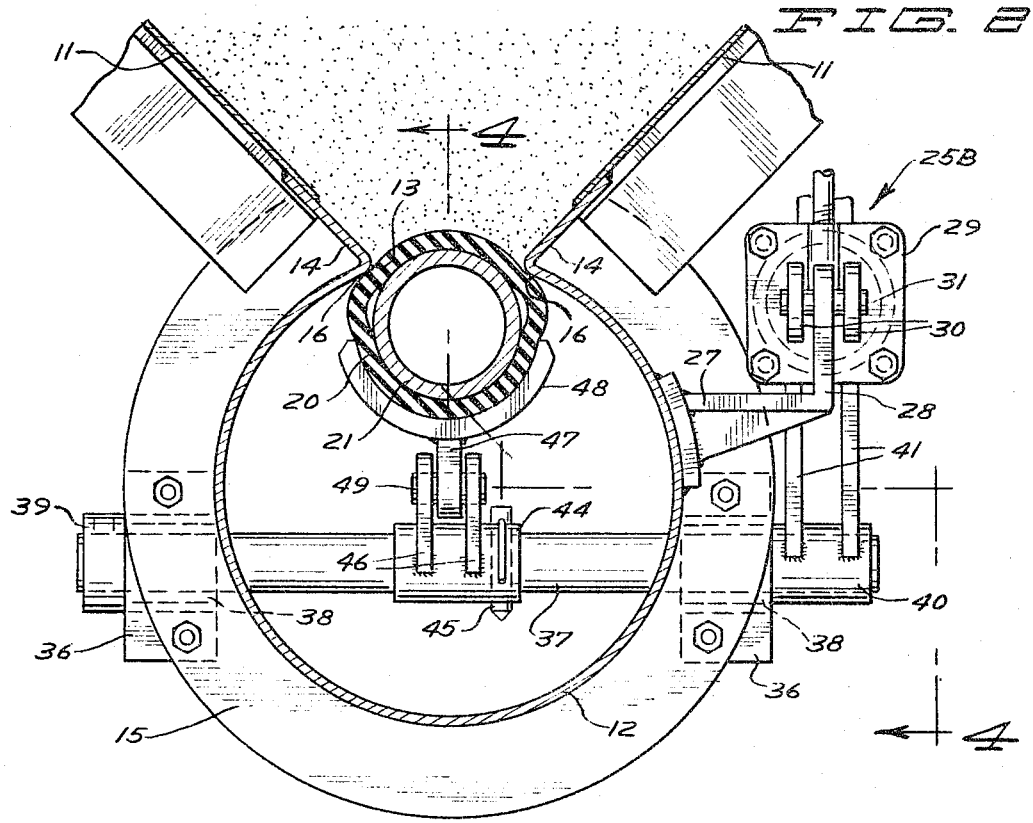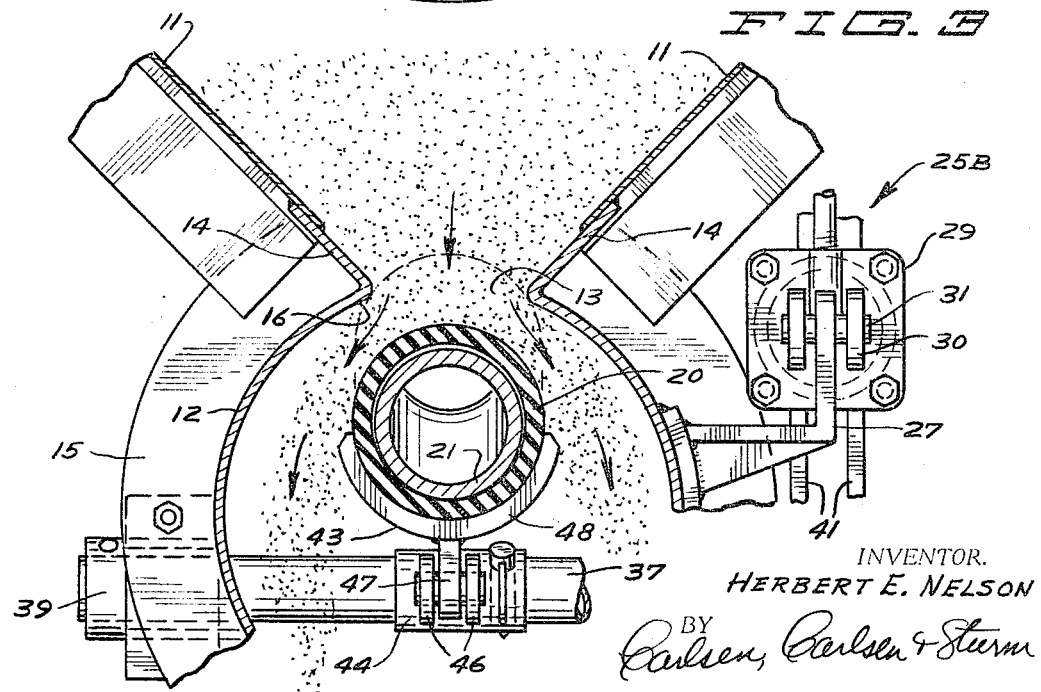

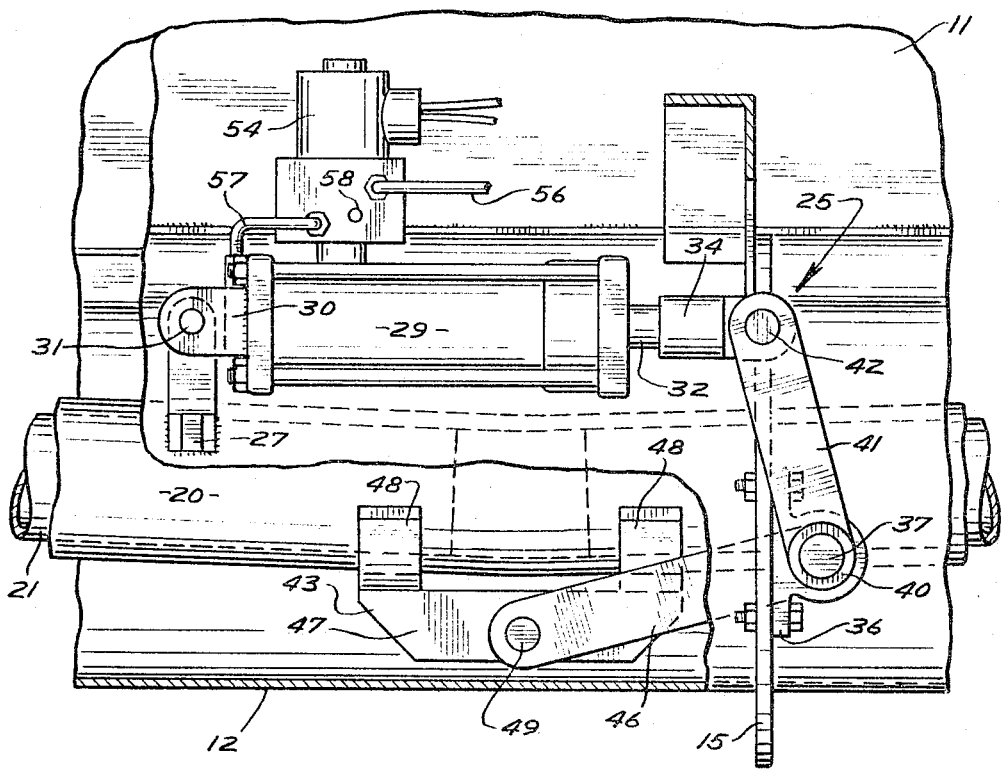

3,268,267
DRIER TANK DUMPING AND CONVEYING APPARATUS
Herbert E. Nelson, % Mora Industries, Inc., Mora, Minn.
Filed Apr. 19, 1965, Ser. No. 449,112
5 Claims. (Cl. 302—52)

This invention relates to apparatus for emptying and conveying powdered granular material from a drier such as used to dehydrate milk, eggs, wheat glutin or the like.

In conventional drier construction the residual dehydrated powder is conveyed from the drying chamber by means of an auger conveyor. This method has certain inherent deficiencies in that it is slow, the mechanism is difficult to clean and maintain, and the movement of the auger against its housing causes an undesirable grinding of the powder conveyed and frequently causes metal particles of one of the components to flake off into the product.

A primary object of the present invention is to provide a conveyor apparatus for pneumatically emptying and carrying off the granular material from a drier tank.

Another object of the invention is to provide an apparatus for quickly removing the dehydrated material from the heated area of a milk drier or the like.

Still another object of the invention is to provide a conveyor system for carrying off granular material from a tank type drier which produces an immediate cooling effect upon the material.

Still another object of the invention is to provide such a conveyor which will effectively operate without the possibility of any metal particles flaking off into the product conveyed.

Still another object is to provide such a conveyor which will not perform any grinding or milling action on the product conveyed.

Another object of the invention is to provide such a conveyor system and apparatus which is subject to a minimum of frictional wear between parts and which is relatively simple to clean and repair.

Still another object of the invention is to provide a novel and improved apparatus for dumping a drier tank in sections.

With these objects in view the invention broadly comprises a drying tank having an elongated outlet opening extending along its bottom, a tube extending along and under the tank in open communication with said outlet opening, an elongated flexible closure member extending through the tube in normal upward sealing relation against said outlet opening, means creating an air stream through the tube and means for flexing the closure member downwardly at selected points or stations along its length to dump material from the tank into said tube to be carried off in said air stream.

The above mentioned and additional objects of the invention will be brought to light during the course of the following specification, reference being made to the accompanying drawings, in which—

FIG. 1 is a side elevation of a drier tank incorporating the improved emptying and conveying mechanism.

FIG. 2 is an enlarged transverse vertical section taken on line 2—2 of FIG. 1 showing the closure means at one station in closed position.

FIG. 3 is similar to FIG. 2 but is taken on line 3—3 of FIG. 1 at a different station showing the closure means in open position.

FIG. 4 is a longitudinal vertical section taken along line 4—4 of FIG. 2 and partially broken away to show two different closure stations.

FIG. 5 is a side elevation of one of the fluid cylinders and its connecting linkage with the closure means open.

Referring now more particularly to the drawings, reference characters will be used to denote like parts or structural features of the invention in the different views. In FIG. 1 there is shown the lower portion of an elongated drier tank 10 having transversely opposing downwardly converging side walls 11 which terminate short of meeting. A conveyor tube or trough 12 has an opening 13 along its top side from which walls 14 (FIG. 2) flare outwardly for connection with walls 11 to form extensions thereof. The opening 13 accordingly provides an elongated discharge slot along the entire length of the tank 10 for passage of material therefrom into the trough 12.

Trough 12 has a plurality of arcuate stiffening flanges 15 as best shown in FIG. 1. Means are provided for creating a constant flow of air longitudinally through the trough in the direction of the arrows or toward the left as viewed in FIG. 1. This is preferably created by a suction fan 17 at the front end of the trough 12 pulling air into the rear end of the trough through the filter 18.

The discharge opening 13 has a constant width throughout its length and the wall of the trough 12 adjacent the lines where it joins the wall extensions 14 provides a downwardly facing closure seat 16.

A section of flexible tubing 20 of neoprene or the like having a diameter somewhat greater than the width of opening 13 and seat 16 extends longitudinally through the trough for the full length of the opening and slightly beyond the ends of the tank. A plurality of rigid pipe sections 21 are disposed within the tubing 20 and are spaced apart a small distance as at 22 (FIG. 4). These sections 21 serve to sectionally stiffen the tubing 20 and act as rigidifiers to facilitate holding of the tubing in upward sealing relation against the seat 16 as will now be described.

A plurality of actuator devices are mounted along the trough 12 and each is designated generally by the number 25. These devices are identical in construction but are distinguished from each other by the letters A, B, C and D. The actuators 25B shown in FIG. 3 will now be described in detail.

A bracket 27 is mounted to extend outwardly from one side of the trough 12 and has an upstanding arm 28. An air cylinder 29 has a pair of spaced ears 30 at its forward end which are pivotally connected on a transverse axis to the arm 28 by pin 31. The cylinder 29 carries a piston which is connected to a rearwardly projecting rod 32 (FIG. 5), the end of which is capped by a connector member 34.

A pair of bearing blocks 36 are mounted one on either side of trough 12 by being secured to one of the flanges 15 on the trough. These blocks 36 jointly journal for rotation therein a transverse rocker shaft 37 which extends through the side walls of the trough. Bearings 38 are disposed within each of the bearing blocks 36 and encircling the shaft 37. A stop collar 39 is mounted on one end of the shaft to prevent endwise removal thereof and a collar 40 carrying spaced links 41 is mounted on the other end of the shaft. Links 41 receive the member 34 therebetween and are pivoted thereto by pin 42. It will accordingly be understood that as the rod 32 is extended and retracted with respect to the cylinder 29, the shaft 37 will be oscillated about its axis.

A collar 44 is mounted on the central portion of shaft 37 and held against axial or rotary movement thereon by the pin 45. A pair of links 46 are integrally mounted on the collar 44 to extend forwardly therefrom in parallelism. A tube holder 43 comprises an equalizer bar 47 having upwardly opening coaxial arcuate saddles 48 mounted at each end for seating the flexible tube 20. The center of bar 47 is disposed between the links 46 and is pivoted thereto as by pin 49.

It will be understood that, with the hose seated in the saddles 48, it will be raised or lowered relative to the opening 14 as the shaft 37 is oscillated in one direction or the other. When for example the cylinder rod 32 is in extended position, the pivot 49 and the saddles 48 will be raised as in FIG. 2 or at the left in FIG. 4. It will be noted that the pipe sections 21 within the tubing 20 are arranged and spaced so that the interconnected saddles 48 on each unit 43 will respectively support the adjacent end portions of two different pipes 21 as shown in FIG. 5. It will accordingly be understood that when all of the rods 32 of the various cylinders are extended the tubing 20 will be held in sealing relation under the opening 13 and in engagement with seat 16 throughout the entire length of the drier tank. When, however, any one of the cylinders 29 is actuated to retract the rod 32 carried thereby, as shown in FIG. 5, the tube holder 43 will be lowered unsealing the opening 13 in that area (FIG. 3).

The cylinders can, of course, be operated in various ways. In the construction shown in the drawings, each cylinder is provided with a solenoid valve 54. A line 55 (FIG. 1) has its forward end connected to a source of air under pressure and extends rearwardly along the trough 17 with a branch line 56 leading into each solenoid. A short feeder line 57 then extends from the solenoid into the front end of the cylinder 29. In addition the solenoid has an exhaust port 58. In normal condition the valve 54 admits the pressure in line 56 to line 57 and into the cylinder 29 and against the front side of the piston therein to hold the rod 32 in extended position. When in this position, as heretofore explained, the tube holder 43 will be in its raised position as in FIG. 2 to hold the tubing 20 in sealing relation against the seat 16.

A timing device 60 having a series of sequentially engageable contacts one for each solenoid 54 in the actuators 25A, B, C and D is mounted adjacent to the drier tank. As the timer closes the circuit to one of the solenoids, the solenoid valve will be actuated to close off line 56 and open line 57 to atmosphere through the port 58. As this occurs, with the release of air pressure from the cylinder, a spring (not shown) within the cylinder 29 acting upon the rear side of the piston will move the piston forwardly rotating the shaft 37 and lowering the tube holder 43 allowing the tubing 20 in that area to lower to the position shown in FIG. 3 unsealing the opening 13.

The timer is set to so actuate the solenoid for a period of only a few seconds. During this period granular material in the tank located above the released section of the tubing 20 will be dumped into the trough 12 to be carried therethrough in the air stream passing forwardly through the trough. As the solenoid is deenergized by the timer, the valve will then resume its original condition and the air pressure from line 56 will again pass through line 57 into the cylinder to force the piston rearwardly and raise member 43 to again bring the tubing into sealing engagement with respect to the opening 13.

When the cycle at station B has been completed the timer will then similarly and sequentially operate the devices C, D, and A. There may be a brief period of time between each complete dumping sequence. In other words, it may be desirable to leave all stations closed for a brief period during the drying operation before the sequential dumping operation is repeated.

In any event, it will be understood that while it would be possible to dump all four stations simultaneously, the preferred manner of operation is to dump the tank by sections as explained, as this provides for a relatively continuous and uniform flow through trough 12 within a minimum air flow velocity therein.

The mechanism accordingly economically and effectively carries out the aforementioned objectives. It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a drier tank for collecting dry granular material and having an elongated open area extending along the bottom thereof for discharging the material from the tank, a suction tube extending along the underside of the tank and having open connection with the interior of the tank through said open area, a flexible member extending through the tube and disposed in normal sealing relation against the underside of the tank to close said open area, means for flexing said flexible member downwardly to allow the discharge of granular material from the tank and through said open area into the tube, means connected to said suction tube creating a flow of air through the tube, and said flexible member comprising a tubular hose of resilient material, and said flexing means including a section of stiff material disposed within the hose and means for momentray movement of the said section downwardly away from the tank to carry the surrounding portion of the hose therewith.

2. The subject matter of claim 1 wherein a plurality of said sections of stiff material are disposed in a spaced end to end arrangement within the hose, and said last mentioned means is adapted to so move said sections independently and in a selected sequence.

3. In a drier tank for collecting dry granular material and having downwardly converging side walls which are spaced apart along their bottom edges to form an elongated discharge opening extending along the bottom of the tank, an elongated conveyor trough extending along the bottom of the tank under said discharge opening with the upper edges of the trough respectively connected to the side walls for open communciation between the tank and trough through said opening and with said edges forming a downwardly facing seat within the trough, fan means connected to one end of the trough to create a unidirectional flow of air therethrough, a tube of impervious flexible material extending longitudinally through the trough and having an external diameter greater than the width of said discharge opening, a plurality of holding means mounted along the trough in spaced relation, each holding means including a saddle member engaging the tube and actuator means for raising and lowering the saddle member, the actuator means including an extensible pneumatic cylinder, a common air pressure line, a plurality of solenoid valves one connecting each cylinder with the pressure line, and electrical timer means for sequentially operating the solenoid valves to sequentially operate said cylinders.

4. In a tank for dry granular material and having downwardly converging side walls which are spaced apart along their bottom edges to form an elongated discharge opening along the bottom of the tank, an elongated conveyor trough extending along the bottom of the tank under said discharge opening and having walls connected to the tank for open communication between the tank and trough through said opening and with said bottom edges forming a downwardly facing seat within the trough, a tube of impervious flexible material extending longitudinally through the trough and having an external diameter greater than the width of the discharge opening, a plurality of stiffener members disposed in longitudinal alignment within the tube to prohibit collapse of the tube while yet allowing longitudinal flexibility therein, a plurality of saddle members spaced longitudinally along and within the trough and engaging the underside of the tube to hold it firmly against said seat to seal the discharge opening closed, and operating means connected to said saddle members for lowering said members independently and alternately to allow the tube to move away from the seat and open the opening in that area.

5. The subject matter of claim 4 wherein said operating means includes a plurality of pneumatically operated cylinders connected one to each saddle member for raising and lowering said member, and a supply of air under pressure connected to each of said cylinders for operating the same.

References Cited by the Examiner

UNITED STATES PATENTS

| | | | |
|---|---|---|---|
| 2,464,183 | 3/1949 | Norbom | 302—52 |
| 2,913,147 | 11/1959 | Johnson et al. | 222—70 |
| 3,105,721 | 10/1963 | Collins et al. | 302—52 |
| 3,182,954 | 5/1965 | Borger | 302—52 |
| 3,189,388 | 6/1965 | Borger et al. | 302—52 |

ANDRES H. NIELSEN, *Primary Examiner.*